US006534156B1

(12) United States Patent
Baker et al.

(10) Patent No.: US 6,534,156 B1
(45) Date of Patent: *Mar. 18, 2003

(54) INK-JET MEDIA OVERCOAT LAYERS

(75) Inventors: Julie Baker, Abbots Langley (GB); Malcolm D. Purbrick, Bushey (GB); Charles E. Romano, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/622,305

(22) PCT Filed: Dec. 14, 1999

(86) PCT No.: PCT/GB99/04243

§ 371 (c)(1),
(2), (4) Date: Aug. 15, 2000

(87) PCT Pub. No.: WO00/37260

PCT Pub. Date: Jun. 29, 2000

(30) Foreign Application Priority Data

Dec. 19, 1998 (GB) .......................................... 9827981

(51) Int. Cl.[7] .......................................... B32B 3/00

(52) U.S. Cl. .......................................... 428/195

(58) Field of Search .......................... 428/195, 500, 428/323

(56) References Cited

U.S. PATENT DOCUMENTS

| | | | | | |
|---|---|---|---|---|---|
| 5,863,662 | A | * | 1/1999 | Hornby et al. | 428/483 |
| 5,965,252 | A | * | 10/1999 | Santo et al. | 428/329 |
| 6,089,704 | A | * | 7/2000 | Burns et al. | 347/105 |
| 6,197,409 | B1 | * | 3/2001 | Bodager et al. | 428/212 |
| 6,210,808 | B1 | * | 4/2001 | Naisby | 428/522 |

* cited by examiner

*Primary Examiner*—Bruce H. Hess
*Assistant Examiner*—Michael E. Grendzynski
(74) *Attorney, Agent, or Firm*—Harold E. Cole

(57) ABSTRACT

An image-recording element for inkjet ink images comprises a support, an ink-receptive layer and a top layer, wherein the top layer comprises a polymer that contains both a hydrophilic component and a hydrophobic component, or a mixture of two or more such polymers, the said polymer or polymer mixture being present in the top layer in an amount of from 0.003 to 0.5 g/m$^2$, and wherein the top layer has been hardened with an oxazoline functional polymer. The top layer preferably comprises a polymer that contains both hydrophilic substituents and hydrophobic substituents, for example a polymer selected from the polymers and copolymers of acrylic acid, methacrylic acid, acrylic acid esters or methacrylic acid esters, or a salt of such a polymer or copolymer. The base layer, which may comprise gelatin, preferably has a thickness of from 3 to 20 μm. The support may be a conventional support, for example a paper sheet. The invention can provide improved drying times for the inkjet images, even under conditions of high humidity.

18 Claims, 2 Drawing Sheets

INK-JET MEDIA OVERCOAT LAYERS

FIELD OF THE INVENTION

This invention relates to inkjet ink imaging, particularly to inkjet ink image recording elements and to a method for their production.

BACKGROUND

In a typical inkjet recording or printing system, ink droplets are ejected from a nozzle at high speed towards a recording element or medium to produce an image on the medium. The ink droplets, or recording liquid, generally comprise a recording agent, such as a dye or pigment, and a large amount of carrier liquid, in particular a solvent. The solvent, or carrier liquid, typically is made up of water, an organic material such as a monohydric alcohol or a polyhydric alcohol or a mixed solvent of water and one or more water-miscible solvents such as a monohydric alcohol or a polyhydric alcohol.

The recording elements typically comprise a support or a support material having on at least one surface thereof an ink-receiving or image-forming layer. The elements include those intended for reflection viewing, which usually have an opaque support, and those intended for viewing by transmitted light, which usually have a transparent support.

Although a wide variety of different types of image-recording elements for use with inkjet ink devices have been proposed heretofore, there are many unsolved problems in the art and many deficiencies in the known products which have severely limited their commercial usefulness. The requirements for an image-recording medium or element for ink-jet recording are very demanding.

It is well known that in order to achieve and maintain photographic-quality images on such an image-recording element, the recording element should

- Be readily wetted so there is no puddling, i.e. coalescence of adjacent ink dots, which leads to nonuniform density.
- Exhibit no image bleeding.
- Exhibit the ability to absorb high concentrations of ink and dry quickly to avoid elements blocking together when stacked against subsequent prints or other surfaces.
- Provide a high level of gloss and be sufficiently insoluble in typical ink solvents to avoid the development of differential gloss.
- Exhibit no discontinuities or defects that are due to interactions between the support and/or layer(s), such as cracking, repellencies, comb lines and the like.
- Not allow unabsorbed dyes to aggregate at the free surface causing dye crystallisation, which results in bloom or bronzing effects in the imaged areas.
- Be optimised for image fastness to avoid fade from contact with water or radiation by daylight, tungsten light, or fluorescent light.

Image recording elements for inkjet ink images (also referred to herein as inkjet media or inkjet receivers) conventionally have a top or "overcoat" layer coated on top of the ink-receiving or imaging-forming layer, the latter also referred to herein as a base layer. An overcoat layer has been used, in particular, when the base layer contains gelatin or a polymer. The overcoat layer can server various functions, such as to provide physical protection for the underlying layer, reduce tackiness, provide a glossy appearance, offer an ink-receptive surface, carry specific components or allow easier manufacture. The overcoat layers are usually thinner than the underlying base layer typically used for inkjet receivers, such an overcoat layer being commonly about 1 micron ($\mu$m) thick.

As noted above, it is desirable that the inkjet medium or receiver should dry quickly after the application of the ink. It has been found that by omitting the top or overcoat layer it is sometimes possible to reduce the time taken to dry a printed image (as measured by the density of ink transferred to a piece of plain paper sandwiched to the printed image immediately after it exits the inkjet printer). However, this is an unsatisfactory way of improving the drying time, for it entails the loss of the advantageous properties that the overcoat layer was intended to provide.

SUMMARY OF THE INVENTION

The present invention, in one of its aspects, provides an image recording element for ink images, especially inkjet ink images, comprising, in the following order, a support, an ink-receptive layer and a top layer, wherein the top layer comprises a polymer that contains both a hydrophilic component and a hydrophobic component, or a mixture of two or more such polymers, the said polymer or polymer mixture being present in the top layer in an amount of from 0.003 to 0.5 g/m$^2$, and wherein the top layer has been hardened with an oxazoline functional polymer.

The present invention, in another aspect thereof, also provides a method for the preparation of an image recording element for ink images, especially inkjet ink images, which method comprises the steps of forming a precursor element comprising a support and an ink-receptive layer and forming a top layer on the surface of the precursor element remote from the support by applying to the said surface a polymer that contains both a hydrophilic component and a hydrophobic component, or a mixture of two or more such polymers, the polymer or polymer mixture being applied at a rate of from 0.003 to 0.5 g/m$^2$ and in conjunction with an oxazoline functional polymer.

The ink-receptive layer is also referred to herein, for convenience, as a "base layer". However, the presence of one or more additional layers, for example on the side of the support remote from the base and top layers or situated between the support and the said base layer or situated between the base layer and the top layer, is not precluded.

BRIEF DESCRIPTION OF DRAWINGS

In FIG. 2, the results obtained for a conventional image-recording element are included for comparison purposes.

DESCRIPTION OF EXEMPLARY EMBODIMENTS

Figure 1:
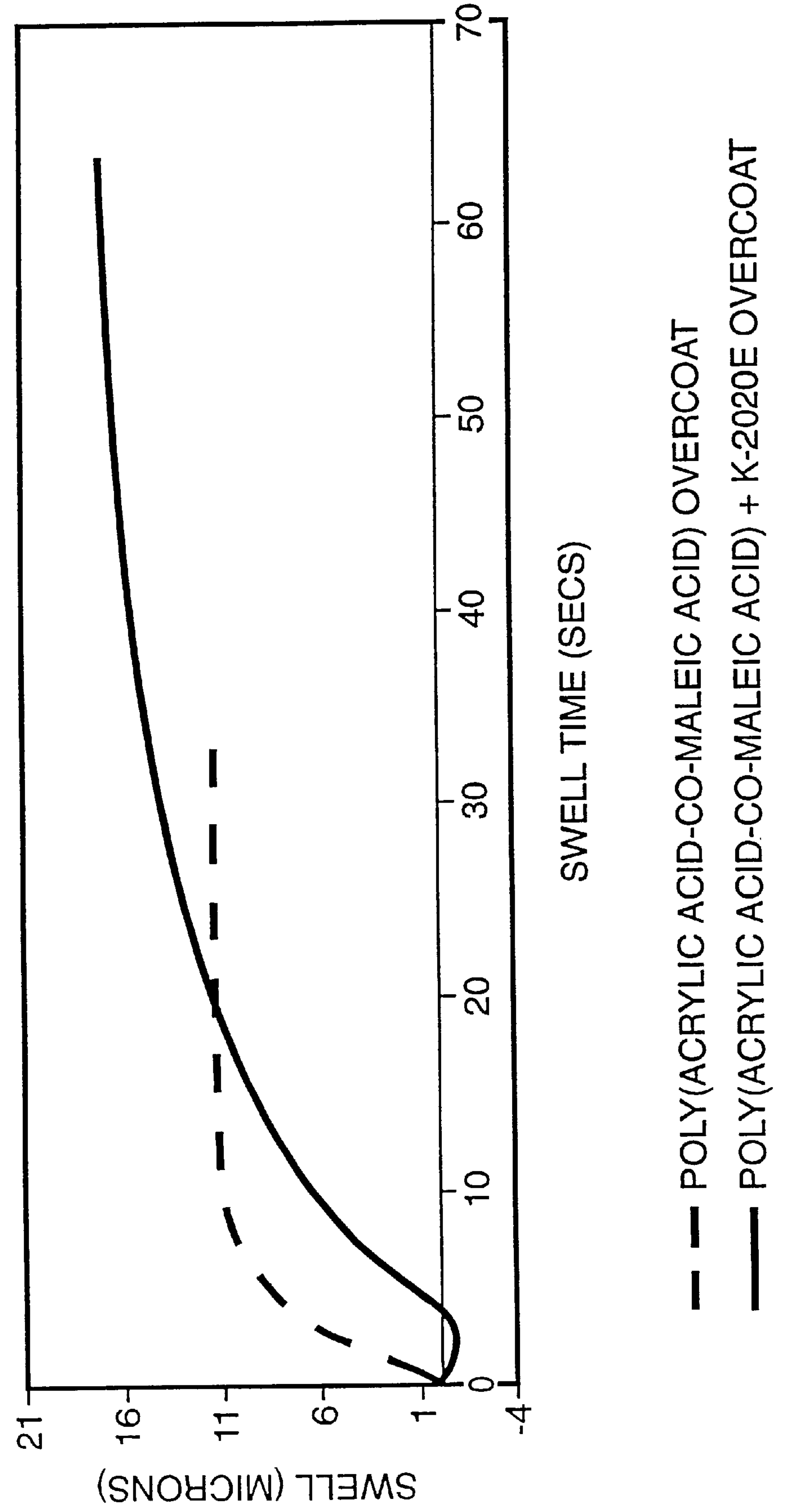
FIG. 1 is a graph showing the results of experiments in which the variation over time in the swelling of an ultra-thin polymer overcoat layer was determined for a first image-recording element according to the present invention and, for comparison purposes, for an image-recording element whose overcoat layer had not been hardened with an oxazoline polymer.

In the present invention, the recording element can be opaque, translucent or transparent. Thus, the supports utilised in the recording element of the present invention are not particularly limited and various supports may be employed. Accordingly, plain papers, resin-coated papers, various plastics, for example a polyester-type resin such as poly(ethylene terephthalate), poly(ethylene naphthalate) and polyester diacetate, a polycarbonate-type resin, a fluorine-type resin such as ETFE, metal foil, various glass materials, and the like can be employed as supports. When the supports of the present invention are transparent, a transparent recording element can be obtained and used as a transparency in an overhead projector.

The supports employed in the present invention are preferably self-supporting. By "self-supporting" is meant a support material such as a sheet of film that is capable of independent existence in the absence of a supporting support.

In certain preferred embodiments the support will be a sheet or sheet-like structure. The thickness of the support will usually be from 12 to 500 μm, typically from 75 to 300 μm.

If desired, in order to improve the adhesion of the base layer to the support, the surface of the support may be corona-discharge-treated prior to applying the solvent-absorbing layer or base layer to the support or, alternatively, an under-coating, such as a layer formed from a halogenated phenol or a partially hydrolyzed vinyl chloride-vinyl acetate copolymer can be applied to the surface of the support.

Especially when the support is a thin sheet or sheet-like structure, it may be advantageous to apply a coating, for example a gel layer, to the side of the support remote from the base layer and top (overcoat) layer, with a view to reducing or eliminating any tendency to curl.

The base layer is primarily intended as a sponge layer for the absorption of ink solvent. As such, it is, in general, primarily composed of hydrophilic or porous materials. Thus, usually the base layer may consist of any hydrophilic polymer or combination of polymers with or without additives as is well known in the art. It usually has a thickness of 3 to 20 μm. The application of one or more additional ink-receptive layers, which may possibly be different in constitution to the base layer, is not, however, precluded.

Hydrophilic materials that may be considered for use as or in the base layer include gelatin, acetylated gelatin, phthalated gelatin, oxidised gelatin, chitosan, poly(alkylene oxide), poly(vinyl alcohol), modified poly(vinyl alcohol), sulfonated polyester, partially hydrolysed poly(vinylacetate/vinyl alcohol), poly(acrylic acid), poly(1-vinylpyrrolidone), poly(sodium styrene sulfonate), poly(2-acrylamido-2-methane sulfonic acid), and polyacrylamide and mixtures of these materials. Copolymers of these polymers with hydrophobic monomers may also be used.

Other materials useful in the base layer include, for example, cellulose derivatives, gum derivatives, chitin and starch.

A porous structure may be introduced into the base layer by the addition of ceramic or hard polymeric particulates, by foaming or blowing during coating, or by inducing phase separation in the layer through introduction of nonsolvent. In general, it is sufficient for the base layer to be hydrophilic, but not porous. This is especially true for photographic quality prints, in which porosity may cause a loss in gloss. Optionally, rigidity may be imparted to the base layer through incorporation of a second phase comprising one or more materials such as polyesters, poly(methacrylates) and polyvinyl benzene-containing copolymers.

The base layer may be pH adjusted to optimise swelling (water capacity), to enhance gloss or to minimise dye migration. For example, in one embodiment of the invention, the pH of the layer is reduced to 3.5 to improve swelling capacity, thereby reducing ink drying times, and to impart waterfastness. In another embodiment, the pH of the image recording layer is raised to 8.5 in order to enhance gloss and reduce bronzing due to surface dye crystallisation.

In certain preferred embodiments of this invention, 50%–100% by weight of the base layer is composed of photographic-grade gelatin, modified such that the pH is far from the isoelectric point of such a gelatin, in order that water uptake may be maximised. The remainder (if any) of the layer may consist of a polymer or inorganic material compatible with said gelatin and which does not adversely impact functional properties.

A mordant may be added in small quantities (2%–10% by weight of the base layer) to further improve waterfastness. Useful mordants are disclosed in U.S. Pat. No. 5,474,843, the teaching in which is incorporated herein by reference.

As indicated above, the top layer comprises, for example consists essentially of, one or more polymers that contain both a hydrophobic component or constituent and a hydrophilic component or constituent. In certain embodiments, the polymer backbone itself, or a part thereof, may constitute one such component, in particular a hydrophobic component. However, preferred polymers contain the following functionalities, namely both hydrophilic substituents and hydrophobic substituents. In general, such substituents will be pendant from, or otherwise incorporated into, the polymer backbone. Various polymers will confer different degrees of hydrophobic and hydrophilic character to the overcoat layer and hence the person skilled in the art will be able to select a particular polymer to fulfil particular requirements.

Suitable polymers include those containing carboxylic acid groups and/or esters thereof and/or salts thereof. In certain preferred embodiments, the top or overcoat layer comprises at least one acrylic polymer, especially at least one polymer selected from the group consisting of (i) polymers of acrylic acid, methacrylic acid, an acrylic acid ester or a methacrylic acid ester, (ii) copolymers containing units derived from at least one of acrylic acid, methacrylic acid, an acrylic acid ester and a methacrylic acid ester, and (iii) salts of the aforesaid polymers (i) and copolymers (ii). Preferred acrylic and methacrylic acid esters are the alkyl esters, especially the $C_1$–$C_6$ alkyl esters, more especially the methyl or ethyl esters. Suitable salts include the alkali metal salts, for example the sodium or potassium salts.

The copolymers may consist essentially of units derived from two or more of acrylic acid, methacrylic acid, acrylic acid esters and methacrylic acid esters. However, other suitable copolymers comprise units derived from at least one of the said acids and esters, together with units derived from one or more other monomeric species, e.g. ethylene glycol, ethylene oxide, a carboxylic acid, for example maleic acid, or a (meth)acrylic acid amide. Various types of copolymer may come into consideration, including block copolymers and graft copolymers. Crosslinking of the polymers and copolymers may also come into consideration.

The following polymers, for instance, come into consideration:

poly(methyl methacrylate);

poly(methyl methacrylate-co-methacrylic acid);

poly(methyl methacrylate-co-poly(ethylene glycol) methacrylate) copolymer;

poly(acrylic acid-co-maleic acid), sodium salt;

poly(acrylic acid), potassium salt, lightly cross linked;

poly(acrylic acid-co-acrylamide), potassium salt;
poly(acrylic acid), sodium salt-graft-poly(ethylene oxide) cross linked; and poly(acrylic acid), avg MW 450,000.

By way of illustration, in poly(methyl methacrylate-co-poly(ethylene glycol)methacrylate) copolymer, the methyl methacrylate group is more hydrophobic than the etherified group, which latter therefore constitutes the hydrophilic component. In poly(acrylic acid-co-maleic acid), the acrylic moiety is the more hydrophobic, the maleic moiety therefore constituting the hydrophilic component. In poly(methyl methacrylate) the polymer backbone is regarded as the hydrophobic component and therefore the methacrylic ester group is regarded as the hydrophilic component.

To form the top layer in accordance with the present invention, the constituent polymer or mixture of polymers is generally applied at a rate of from 0.003 to 0.5 $g/m^2$. In certain preferred embodiments, the laydown of the polymer or polymer mixture is in the range of from 0.004 to 0.2 $g/m^2$, more preferably from 0.005 to 0.1 $g/m^2$. As a guide, a laydown of 1 $g/m^2$ gives rise to a thickness of 1 $\mu$m, assuming uniform application.

It has been found that the application of the polymers at the above laydowns to form the topcoat in accordance with the present invention results in a discontinuous top layer. The top layer will typically cover 50–75% of the surface area, as measured by atomic force microscopy. The discontinuities may be randomly distributed. Although the applicant does not wish to be bound by theory, it is believed that such amphiphilic "overcoat" polymers will be templated (or "induced" or "constrained") by the conditions under which they are coated and by the nature of the underlying substrate, so that the conformation assumed by the "overcoat" polymer will lead to a predominance of hydrophobic substituents at the top surface of the inkjet element or medium, with hydrophilic groups tending to be drawn towards the underlying (substrate or base) layer. It is believed, however, that, notwithstanding the presentation of the hydrophobic domains at the surface, the discontinuities in the top layer allow the inkjet ink to migrate rapidly to the hydrophilic domains with consequent improvements in drying time.

Since the image recording element may come in contact with other image recording articles or the drive or transport mechanisms of the image recording devices for which its use is intended, additives such as surfactants, lubricants, matte particles and the like may be optionally added to the element to the extent that they do not unduly degrade properties of interest.

In accordance with the present invention, the top layer is selectively hardened by means of an oxazoline functional polymer. Preferred such polymers (which term in this context includes copolymers) are water-soluble or water-dispersible polymers comprising a polymer backbone and pendant oxazoline groups, e.g. groups of the formula.

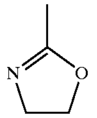

The said oxazoline functional polymer is generally incorporated in the top-coat (or overcoat) material (coating composition) before the latter is coated onto the base layer. Typically, the oxazoline functional polymer will be coated at a rate of from 0.05 to 0.25 $g/m^2$. Suitable oxazoline functional polymers are available in the art, in particular as aqueous solutions and as aqueous emulsions; one such polymer is available under the trade name Epocros K-2020E (from Esprit Chemical Company, Florida, U.S.A.).

The layers described above, including the base layer and the top layer, may be coated by conventional coating means onto a support material, e.g. a transparent or opaque support material commonly used in this art. Coating methods may include, but are not limited to, wound wire rod coating, slot coating, slide hopper coating, gravure, curtain coating and the like. Some of these methods allow for simultaneous coatings of both layers, which is preferred from a manufacturing economic perspective.

The inks used to image the recording elements according to the present invention are well-known inks. The ink compositions used in ink-jet printing typically are liquid compositions comprising a solvent or carrier liquid, dyes or pigments, humectants, organic solvents, detergents, thickeners, preservatives, and the like. The solvent or carrier liquid can be comprised solely of water or can be predominantly water mixed with one or more other, water-miscible, solvents such as polyhydric alcohols, although inks in which organic materials such as polyhydric alcohols are the predominant carrier or solvent liquid also may be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946, 4,239,543 and 4,781,758, the teaching in each of which is incorporated herein by reference.

Although the recording elements disclosed herein have been referred to primarily as being useful for ink-jet printers, they also can be used as recording media for pen plotter assemblies. Pen plotters operate by writing directly on the surface of a recording medium using a pen consisting of a bundle of capillary tubes in contact with an ink reservoir.

The image recording elements according to the present invention exhibit excellent drying times in comparison with conventional elements containing thicker top layers containing cellulose compounds. Indeed, in certain embodiments of the present invention the improvements in drying time, especially at high humidity, can exceed those obtained by simply omitting the top or "overcoat" layer or by using a very thin overcoat layer without selective hardening with an oxazoline functional polymer. The recording elements according to the present invention can exhibit excellent drying times even under conditions of high humidity. Moreover, the improvements in drying time may be obtained whilst retaining the usual desirable properties offered by the use of a top or "overcoat" layer. For example, it may be possible, according to the present invention, to obtain image recording elements that not only dry quickly but also exhibit a high degree of gloss and exhibit no blocking or offset under the demanding conditions (high ink laydown) of photographic quality printing. Imaged elements exhibit adequate water and light fastness for typical printing dyes. Further, the elements can be manufactured with ease at low cost.

The present invention is illustrated in and by the following Example.

EXAMPLE 1

Samples were prepared of an image recording element for inkjet ink images, each sample comprising a resin-coated paper support, on the back of which was coated a gel layer in order to overcome curl. On the front side of the support a gelatin ink-absorbing layer was coated onto the support at a gel laydown of 7.63 $g/m^2$. The ink-absorbing layer included 848 $mg/m^2$ of a cationic latex polymer (a polymer of (m- and p- chloromethyl) ethenyl benzene and 2-methyl-2-propenoic acid 1,2-ethanediylester, quaternized with N,N-dimethylmethanamine) which acts as a mordant and also 129.16 $mg/m^2$ of polymeric matte (limited coalescence polystyrene beads, 20 μm). An ultra-thin top layer or overcoat was applied to the gelatin ink-absorbing layer.

To form Sample A, the overcoat consisted of poly(acrylic acid-co-maleic acid), sodium salt, which was coated at a rate of 0.006 $g/m^2$; this resulted in a layer having a thickness in the range of from 0.005 to 0.1 μm.

To form Sample B, the overcoat consisted of poly(acrylic acid-co-maleic acid), sodium salt, which was coated at a rate of 0.006 $g/m^2$ and an oxazoline functional polymer (Epocros K-2020E), which was coated at a rate of 0.12 $g/m^2$.

Images were applied to the samples using an HP PhotoSmart Printer with the following settings: HP PhotoSmart glossy photographic paper; best print quality; and PhotoSmart best colours. The time taken for each printed image to dry was evaluated by the density of ink transferred to a piece of plain paper that had been sandwiched to the printed image immediately after the sample had exited the inkjet printer. In each case, a series of evaluations were carried out in order to measure the density of ink transferred to the plain paper after certain prescribed periods of time. In general, the lower the ink density on the plain paper, the faster the sample had dried. The evaluations were carried out at 80% relative humidity, such conditions providing a demanding test of the ability to dry quickly.

Table 1 hereinafter shows the results for the density of ink transferred to the plain paper after various time intervals after the imaged paper had exited the printer. The results are shown for samples A and B, in comparison with the control, wherein the image-recording element was Kodak (trade mark) Inkjet Photographic Quality Paper Photo Weight.

The results in Table 1 show an improvement in dry time owing to the presence of the very thin poly(acrylic acid-co-maleic acid) overcoat, as shown by the reduced density of ink transferred to the plain paper. However, a further improvement is seen when the overcoat is selectively hardened with the oxazoline functional polymer, Epocros K-2020E, which resulted in almost no ink being transferred to the plain paper.

Further tests were carried out in which the swell, expressed in microns (μm), was measured at various time intervals, measured in seconds. One set of measurements was carried out with an overcoat applied as in the above-described Sample A, consisting of poly(acrylic acid-co-maleic acid), sodium salt, and a further series of measurements were taken for an overcoat prepared according to the above-described Sample B, wherein the overcoat comprised poly(acrylic acid-co-maleic acid), sodium salt, and Epocros K-2020E. The results are shown graphically in FIG. 1, which demonstrates the effect of oxazoline functional polymers on swell. The graph indicates that the coating containing the oxazoline functional polymer exhibited a delay before swelling, followed by a reduced rate of swell. This demonstrates that the layer containing the oxazoline functional polymer (the very thin polymeric overcoat) is being selectively hardened (as opposed to hardening of both the top layer and the gelatin ink-receptive base layer).

Figure 2:
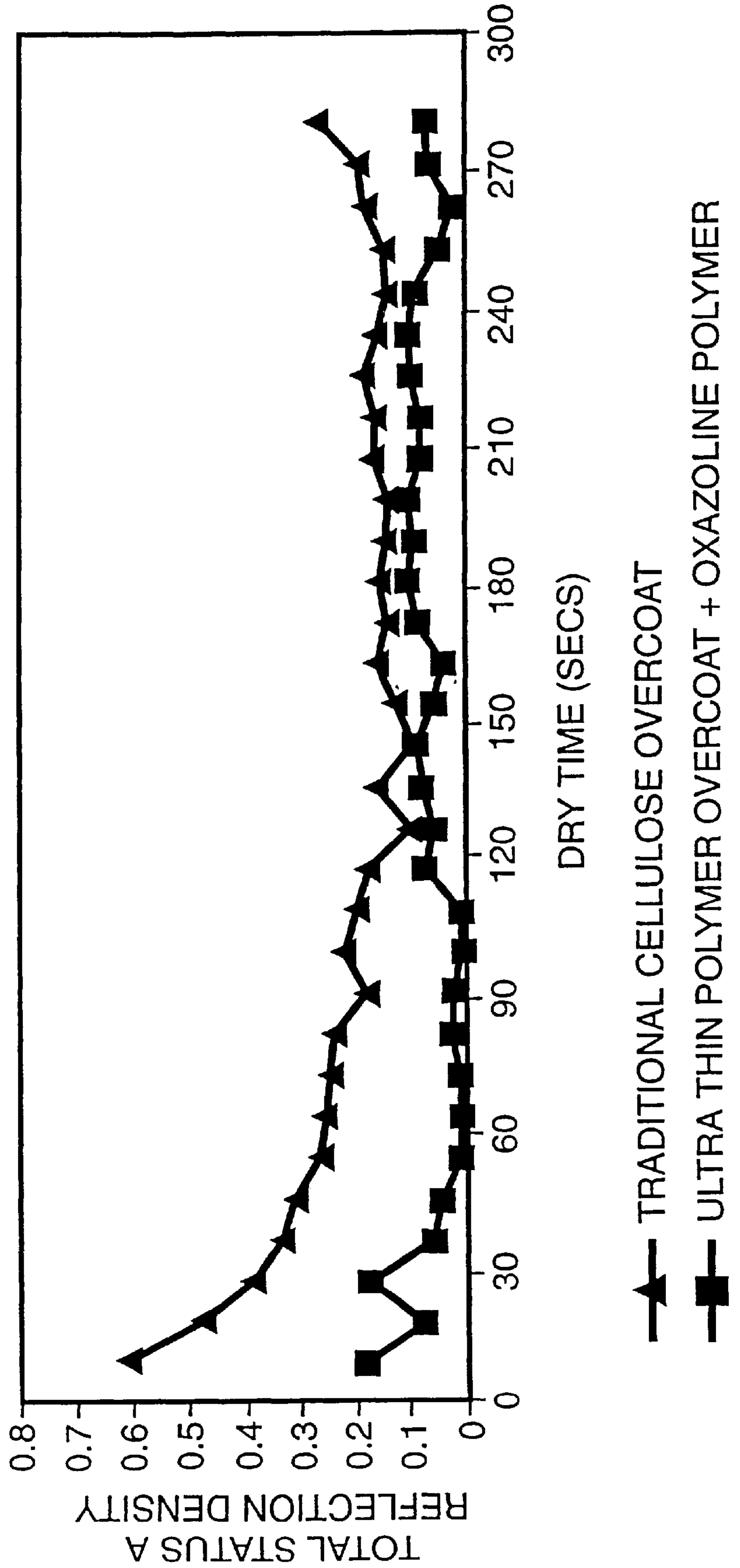
FIG. 2 is a graph showing the results of experiments in which the Total Status A Reflection Density was measured for a series of drying times, for an image-recording element according to the present invention.

Further tests were carried out by measuring the total status A reflection density for a sample of an inkjet image-recording element prepared in the same manner as Sample B above, over a range of drying times. Use was made of an HP PhotoSmart Printer and the tests were conducted at 80% RH. Similar tests were carried out, by way of comparison, on a conventional image-recording element for inkjet ink images, the conventional elements having a top layer comprising cellulose compounds coated at a rate of 1 $g/m^2$. The results are shown in FIG. 2.

The extent of the coverage of polymer overcoats according to the present invention was investigated by means of atomic force microscopy (AFM). In AFM, phase imaging maps the phase of the cantilever oscillation during the tapping mode scan and detects variations in composition, adhesion, friction and viscoelasticity. It is possible to evaluate the extent of the coverage in the phase mode in terms of the bearing area measurements calculated from the phase mode images.

The AFM measurements were carried out on samples prepared similarly to sample A above but with various laydowns of the poly(acrylic acid-co-maleic acid). Also, to simplify the investigation the oxazoline functional polymer was omitted. In each case three images were taken, from which the geometric mean bearing area coverage was calculated. The results are shown in Table 2 below.

The conclusion to be drawn from the results in Table 2 is that the overcoat comprising the poly(acrylic acid-co-maleic acid) was discontinuous, the extent of the coverage varying within the range from about 50% to about 75%.

TABLE 1

| Polymer | Density of Ink Transferred to Plain Paper After ... | | | |
|---|---|---|---|---|
| Overcoat | 9 seconds | 18 seconds | 45 seconds | 72 seconds |
| Control | 0.605 | 0.475 | 0.307 | 0.243 |
| A | 0.331 | 0.195 | 0.132 | 0.111 |
| B | 0.179 | 0.078 | 0.046 | 0.009 |

TABLE 2

| Concentration | % Bearing Area Coverage | | | Geometric Mean | Standard Deviation |
|---|---|---|---|---|---|
| ($g/m^2$) | Image-1 | Image-2 | Image-3 | Bearing | Bearing |
| 0.004 (a) | 62.91 | 63.79 | 64.05 | 63.58 | 0.60 |
| 0.004 (b) | 54.69 | 52.00 | 54.45 | 53.70 | 1.49 |
| 0.006 | 66.84 | 59.10 | 65.06 | 63.58 | 4.05 |
| 0.012 | 68.74 | 65.38 | 71.70 | 68.56 | 3.16 |
| 0.024 | 71.58 | 66.72 | 66.80 | 68.33 | 2.78 |
| 0.036 | 74.61 | 69.49 | 72.83 | 72.28 | 2.60 |

(a) Measurements taken at the edge of the sample
(b) Measurements taken at the centre of the sample It will, of course, be understood that the present invention has been described above purely by way of example and that modifications of detail can be made within the scope of the invention.

What is claimed is:

1. An image recording element for ink images comprising, in the following order, a support, an ink-receptive layer and a top layer, characterised in that the top layer comprises a polymer that contains both a hydrophilic component and a hydrophobic component, or a mixture of two or more such polymers, the said polymer or polymer mixture being present in the top layer in an amount of from 0.003 to 0.1 $g/m^2$, the top layer being discontinuous and covering from 50 to 75% of the surface area, as measured by atomic force microscopy, and in that the top layer has been hardened with an oxazoline functional polymer.

2. An element according to claim 1, wherein the polymer or polymer mixture in the top layer is present in an amount of from 0.004 to 0.1 $g/m^2$.

3. An element according to claim 2, wherein the polymer or polymer mixture in the top layer is present in an amount of from 0.005 to 0.1 $g/m^2$.

4. An element according to claim 1, wherein the top layer comprises a polymer that contains both hydrophilic substituents and hydrophobic substituents.

5. An element according to claim 1, wherein the top layer comprises at least one polymer selected from the group consisting of (i) polymers of acrylic acid, methacrylic acid, an acrylic acid ester or a methacrylic acid ester, (ii) copolymers comprising units derived from at least one of acrylic acid, methacrylic acid, an acrylic acid ester and a methacrylic acid ester, and (iii) salts of the polymers (i) and copolymers (ii).

6. An element according to claim 5, in which the said esters are $C_1$–$C_6$ alkyl esters.

7. An element according to claim 6, in which the esters are methyl or ethyl esters.

8. An element according to claim 5, in which the salts are alkali metal salts.

9. An element according to claim 8, in which the salts are sodium and/or potassium salts.

10. An element according to claim 5, in which the copolymers also comprise units of at least one monomer that is not acrylic acid, methacrylic acid, an acrylic acid ester or a methacrylic acid ester.

11. An element according to claim 10, in which the said monomer is ethylene glycol, ethylene oxide, maleic acid or an acrylic acid amide.

12. An element according to claim 1, wherein the ink receptive layer is selected from the group of materials consisting of gelatin, acetylated gelatin, phthalated gelatin, oxidised gelatin, chitosan, poly(alkylene oxide), poly(vinyl alcohol), modified poly(vinyl alcohol), sulfonated polyester, partially hydrolysed poly(vinylacetate/vinyl alcohol), poly (acrylic acid), poly(1-vinylpyrrolidone), poly(sodium styrene sulfonate), poly(2-acrylamido-2-methane sulfonic acid), and polyacrylamide and mixtures of these materials.

13. An element according to claim 12, wherein the ink receptive layer comprises gelatin.

14. An element according to claim 1, wherein the ink-receptive layer-has a thickness of from 3 to 20 μm.

15. An element according to claim 1, wherein at least one of the ink-receptive layer and the top layer includes matte particles.

16. An element according to claim 1 wherein the oxazoline functional polymer is present in an amount of from 0.05 to 0.25 $g/m^2$.

17. An element according to claim 1, in which the discontinuities in the top layer are randomly distributed.

18. A method for the preparation of an image recording element for ink images, which method comprises the steps of forming a precursor element comprising a support and an ink-receptive layer and forming a top layer on the surface of the precursor element remote from the support by applying to the said surface a polymer that contains both a hydrophilic component and a hydrophobic component, or a mixture of two or more such polymers, the polymer or polymer mixture being applied at a rate of from 0.003 to 0.1 $g/m^2$, and in conjunction with an oxazoline functional polymer, to provide a discontinuous layer covering from 50 to 75% of the surface area, as measured by atomic force microscopy.

* * * * *